US012707192B2

(12) United States Patent
Hughes, II et al.

(10) Patent No.: US 12,707,192 B2
(45) Date of Patent: Aug. 11, 2026

(54) CONSTANT COVERAGE HORN

(71) Applicant: Biamp Systems, LLC, Beaverton, OR (US)

(72) Inventors: Charles Emory Hughes, II, Gastonia, NC (US); Michael Alan Brody, Haddon Heights, NJ (US)

(73) Assignee: Bianmp Systems, LLC, Beaverton, OR (US)

( * ) Notice: Subject to any disclaimer, the term of this patent is extended or adjusted under 35 U.S.C. 154(b) by 142 days.

(21) Appl. No.: 18/731,345

(22) Filed: Jun. 2, 2024

(65) Prior Publication Data

US 2025/0373976 A1 Dec. 4, 2025

(51) Int. Cl.
*H04R 1/30* (2006.01)

(52) U.S. Cl.
CPC .................................... *H04R 1/30* (2013.01)

(58) Field of Classification Search
CPC .......... H04R 1/30; H04R 1/288; H04R 1/028; H04R 1/345; H04R 9/06; H04R 9/025
See application file for complete search history.

(56) References Cited

U.S. PATENT DOCUMENTS 5,020,630 A * 6/1991 Gunness .................. H04R 1/30 181/187

* cited by examiner

*Primary Examiner* — Yosef K Laekemariam

(57) ABSTRACT

An example apparatus may include one or more of a throat that includes an opening that receives sound, a bell that directs the sound, a mouth opening that outputs the sound, and a variable-width slot disposed between the throat and the bell which directs the sound, wherein the variable-width slot may include a lower portion with a first width and an upper portion with a second width which is greater than the first width.

19 Claims, 8 Drawing Sheets

CONSTANT COVERAGE HORN

BACKGROUND

A horn provides additional sound pressure level (SPL) at a given listening area by increasing the directivity of the sound towards the listening area. A constant directivity horn essentially means that the directivity and coverage of the sound is the same from the lowest frequency to the highest frequency within a frequency response range of a loudspeaker. In the constant directivity horn, the sound coverage is consistent in both the horizontal and vertical planes in both frequency response and SPL. A constant directivity horn might include a diffraction slot therein through which sound is output. The diffraction slot is typically a fixed width for its entire vertical height. However, one of the drawbacks of the constant directivity horn is the output within the upper portion of its vertical coverage is often less useful, or not useful at all. This is because that part of the vertical coverage from the horn is typically directed towards areas that are farther away than the center of its vertical coverage pattern. Because of the increased distance to these farther areas, the sound pressure level (SPL) reaching those areas will be decreased compared to the SPL in areas that are not as far away. This can result in large variations of the SPL directed to the listeners/audience throughout the coverage pattern of the horn.

SUMMARY

One example embodiment provides a horn that may include one or more of a throat that includes an opening that receives sound, a mouth that outputs the sound, a bell that directs the sound toward the mouth, a coupling transition disposed between the throat and the bell, and a variable-width slot that is the interface between the coupling transition and the bell which directs the sound, wherein the variable-width slot comprises a lower portion with a first width and an upper portion with a second width which is greater than the first width.

Another example embodiment provides a loudspeaker apparatus that may include one or more of a throat that includes an opening that receives sound, a mouth that outputs the sound, a sound source positioned behind the opening of the throat which is configured to output the sound towards the opening of the throat, a coupling transition disposed between the throat and the bell, and a variable-width slot between the coupling transition and the bell which directs the sound, wherein the variable-width slot comprising a lower portion with a first width and an upper portion with a second width which is greater than the first width.

DETAILED DESCRIPTION

Figure 1A:
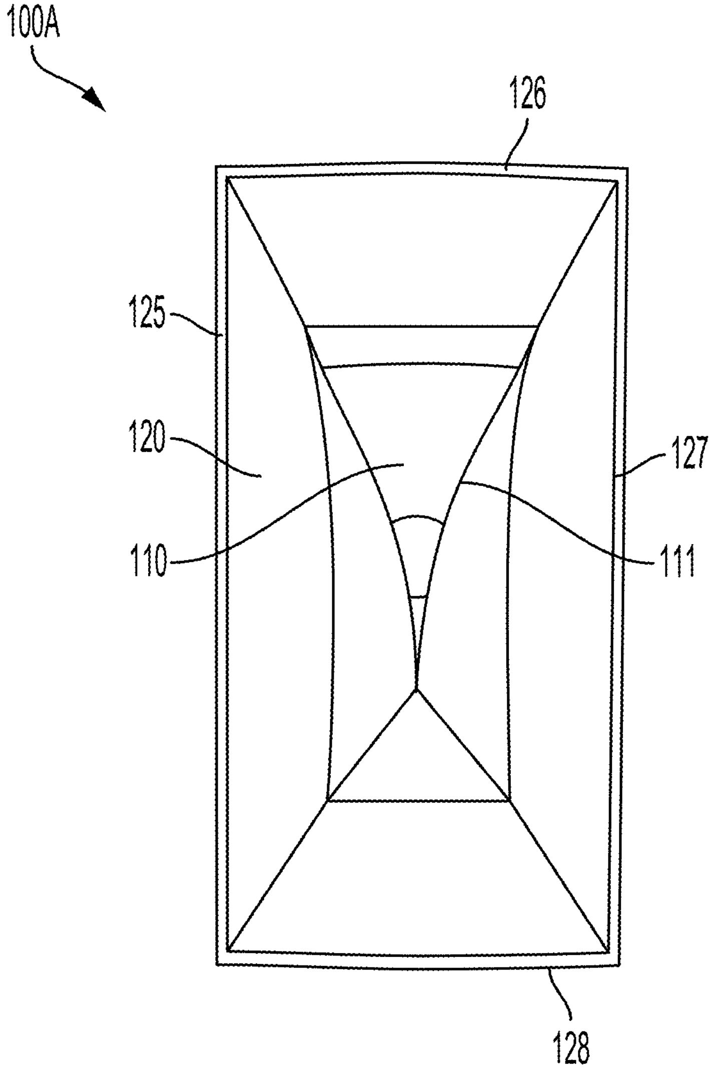
FIG. 1A is a diagram illustrating a front-perspective view of a loudspeaker apparatus according to example embodiments.

Most conventional horns are referred to as constant directivity horns. They seek to provide a consistent distribution of sound pressure level (SPL) within a defined coverage angle as a function of frequency. A better objective is for a loudspeaker to provide consistent distribution of SPL to as many listeners in an intended audience area as possible whilst limiting the sound energy outside of the intended audience area. This requires the shape of the radiation pattern from the horn to be different than that of a constant directivity horn. The example embodiments are directed to a new constant coverage horn that can provide a sound radiation pattern that provides more consistent distribution of SPL to an intended audience while limiting SPL to areas outside of the intended audience area.

The constant coverage horn includes a throat through which sound is received, such as from a driver, and a mouth through which the sound is output. In between the throat and the bell is a novel interface which includes a coupling transition and a variable-width slot at the terminus of the coupling transition. The interface slot is referred to herein as a "variable-width" slot because the size of the slot width changes from a beginning of the variable-width slot to the end of the variable-width slot. In particular, the width of the slot gets wider at the top and narrower at the bottom from the beginning of the variable-width slot to the end of the variable-width slot.

The variable-width slot results in the sidewalls of the slot expanding in a curved manner, or segmented that approximates a curve. The expanding slot creates more acoustic resistance at the bottom of the variable-width slot, where it is narrower, and less acoustic resistance at the top of the variable-width slot, where it is wider. The result is a more favorable acoustic path (less resistance) for the sound energy to travel within the upper portion of the horn compared to the lower portion of the horn which has a less favorable acoustic path (higher resistance). This causes more sound energy, e.g., greater SPL, to be directed to the upper portion of the horn. This is beneficial since the upper portion of the horn directs sound in the vertical plane to the farther areas of the intended audience area, whilst the lower portion of the horn covers the nearer audience areas.

In general, as sound travels through the air, the SPL of the sound decreases. The greater the distance traveled, the greater the attenuation of the SPL. The difference in the distance to the audience areas in the vertical coverage plane of the horn results in more attenuation of the SPL for the farther audience areas. Having the horn concentrate more SPL radiated to the farther audience areas helps to offset the SPL attenuation due to the increased travel distance. This results in a more constant distribution of SPL over the intended audience area within the vertical coverage plane of the horn.

The variable-width slot is shaped to provide a more consistent distribution of SPL within planes normal (perpendicular to) the vertical coverage plane of the horn. The preferred shaping makes a "horizontal" coverage angle of the sound a function of the vertical coverage angle within the horn. The upper portions of the horn direct sound to the farther audience areas in the vertical coverage plane, whilst the lower portions of the horn direct sound to the closer audience areas in the vertical coverage plane. As such, to provide consistent distribution of SPL across the audience area away from the median centerline of the coverage (e.g., the horizontal aspect of the audience area), the horizontal coverage angle of the horn needs to change relative to the vertical coverage angle.

The changing horizontal coverage angle as a function of the vertical coverage may result in the sidewalls of the variable-width slot being curved relative to the axial dimension of the horn, not the typical planar slots found in some traditional constant directivity horns.

The constant coverage horn described herein utilizes a coupling transition between the throat section and the bell section of the horn that is substantially different from previous horns. This coupling transition gradually changes cross section from the throat opening to the variable-width slot interface. The interface described herein acts as a diffraction slot for only the lower portion of the vertical coverage angle of the horn. The narrower horizontal coverage angle(s) utilized in the upper portion of the vertical coverage angle of the horn doesn't require a diffraction slot to achieve the desired horizontal coverage angle. As a result, this interface can be made much wider at the upper portions of the interface. This can provide an improvement to the amount of sound energy (SPL) that can be directed to the upper portion of the horn's vertical coverage (far-end audience) compared to the related art.

Figure 1B:
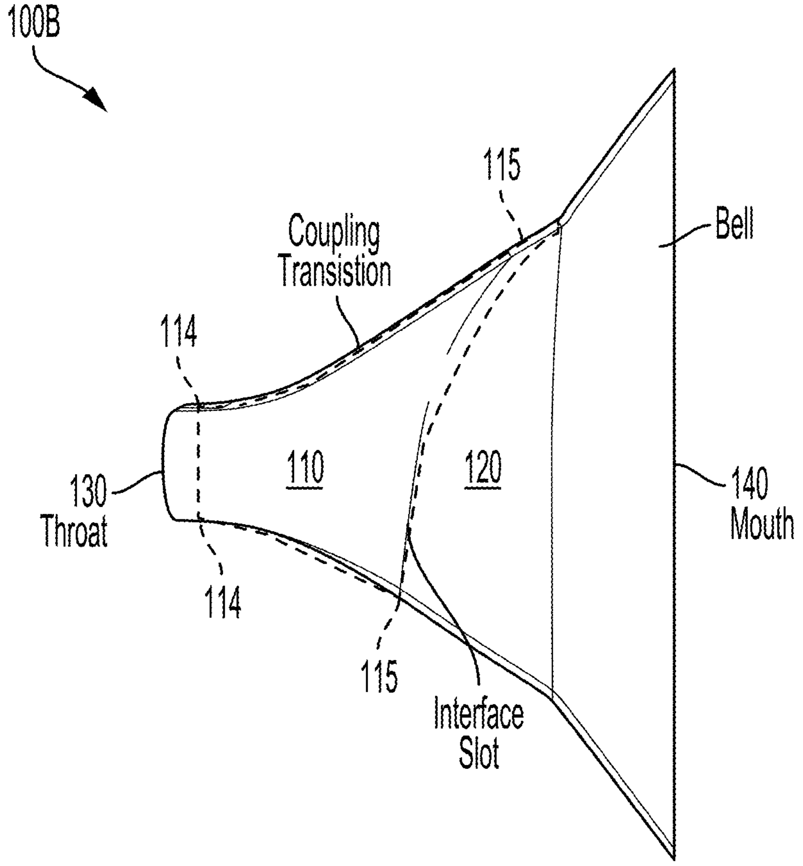
FIG. 1B is a diagram illustrating a detailed view of the interface of the loudspeaker apparatus of FIG. 1A, according to example embodiments.
Figure 1C:
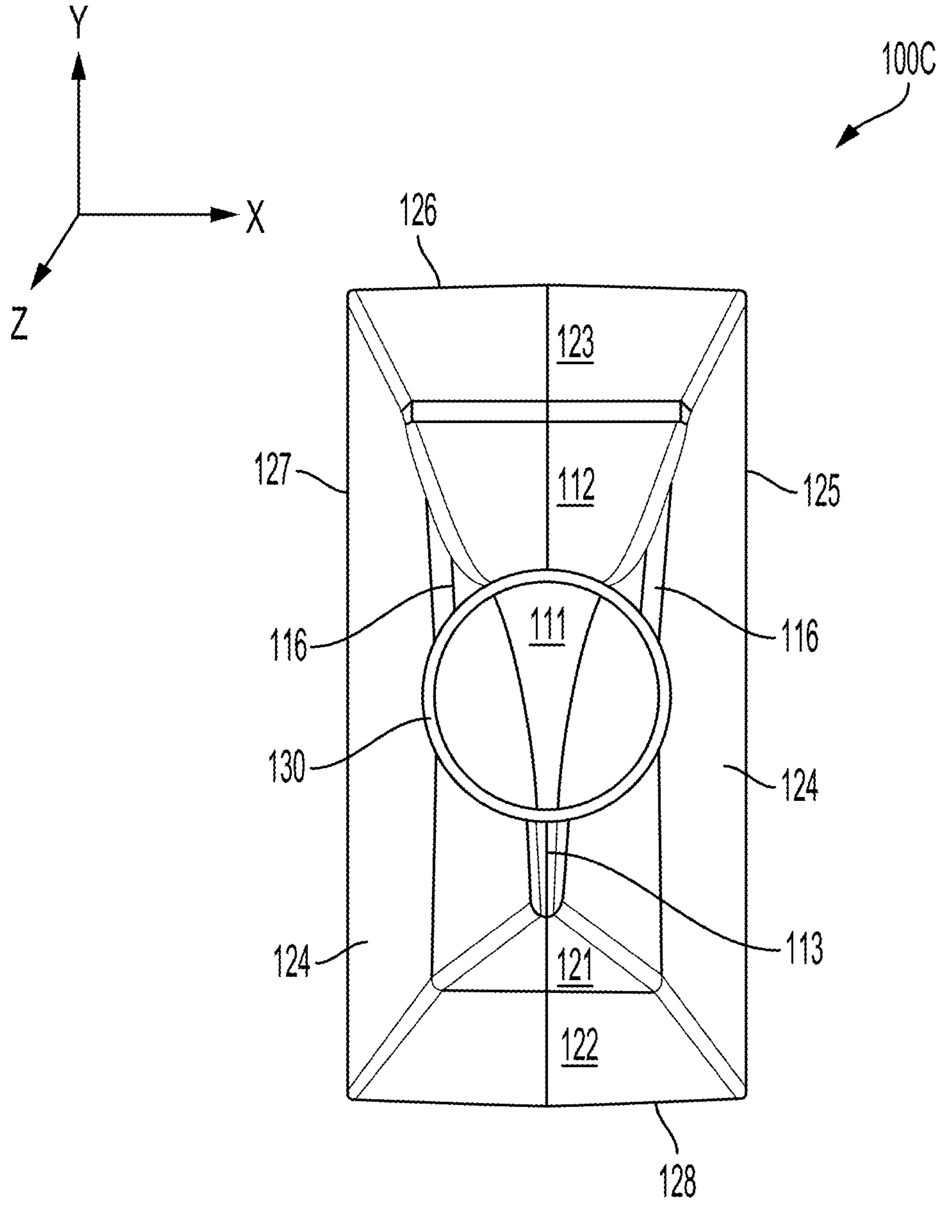
FIG. 1C is a diagram illustrating a rear-perspective view of the loudspeaker of FIG. 1A according to example embodiments.

FIG. 1A illustrates a front-perspective view 100A of a loudspeaker apparatus according to example embodiments, FIG. 1B illustrates a detailed view 100B of the coupling transition and interface of the loudspeaker apparatus of FIG. 1A, according to example embodiments, and FIG. 1C illustrates a rear-perspective view 100C of the loudspeaker of FIG. 1A according to example embodiments.

Referring to FIGS. 1A-1C, the loudspeaker apparatus includes a throat 130, a bell 120, and a coupling transition 110 that interconnects the throat 130 to the bell 120. In this example, sound enters through the throat 130 and is output from the mouth 140 of the bell 120. The coupling transition 110 directs the sound through a variable-width slot 111 disposed at the terminus of the coupling transition 110, which is further described herein. The result is that the distribution of sound energy is directed in a more advantageous pattern in favor of audience members that are farther away than the audience members that are closer, in comparison to a constant directivity horn.

Referring to FIG. 1A, shown is a front-perspective view of the bell 120, the coupling transition 110, and the variable-width slot 111. In this example, the mouth 140 of the bell 120 includes a rectangular border including a first side 125, a top side 126, a second side 127, and a bottom side 128. In this example, the first side 125 and the second side 127 are equal in height, and the top side 126 and the bottom side 128 are equal width. Here, the vertical height of the first side 125 and the second side 127 is greater than the width of the top side 126 and the bottom side 128. Sound may enter through a rear-side of the loudspeaker apparatus and travel through the coupling transition 110 and then to the bell 120. The variable shape and size of the variable-width slot 111 causes restriction on the sound output at the bottom side 128 of the bell 120 and less restriction on the sound output at the top side 126 of the bell 120.

Referring now to FIG. 1B, the coupling transition 110 is shown with dashed lines and includes a beginning 114 and an ending 115 along the length of the horn. Here, the beginning 114 of the coupling transition 110 is relatively vertical/planar in two dimensions (Y-Z plane), however the ending 115 of the coupling transition 110 is curved and not planar in two dimensions (Y-Z plane). The variable-width slot 111 is located at the end of the coupling transition 110. Meanwhile, the bell 120 starts at the variable-width slot 111 located at the ending 115 of the coupling transition 110.

According to various embodiments, the interface slot is referred to as "variable-width" because a shape and an interior size of the slot continuously changes from the bottom of 115 to the top of 115. In particular, the variable-width slot 111 gets narrower on a bottom thereof, while it progressively wider on a top portion thereof. This shape is what creates more restriction on sound pressure level (SPL) output by the bottom of the variable-width slot 111 in comparison to the SPL output at the top of the variable-width slot. The result is a more consistent coverage area of sound to farther-located audience members.

For example, as sound enters a throat 130 of the loudspeaker apparatus, the sound then travels to the coupling transition 110. Here, the transition creates more restriction on the sound in a lower portion of the coupling transition 110 while not as much restriction on the sound in an upper portion of the coupling transition 110 enabling sound to be emitted at a greater SPL from the upper portion than the lower portion of the variable-width slot 111. The result creates a more constant output of sound to a larger area of the audience at farther distances.

Referring now to FIG. 1C, an opening of the throat 130 is shown. Sound enters through the opening of the throat 130 from a sound source such as a driver, speaker, or the like (not shown). In this example, the coupling transition 110 includes an upper portion 112, a bottom portion 113, and two sidewalls 116. Each of the sidewalls 116 are curved in all three dimensions. In other words, the sidewalls 116 curve in both the Y-Z plane and the X-Z plane. The upper portion 112 of the coupling transition 110 includes a trapezoidal shape with a little curve but is more planar than the sidewalls 116. The bottom portion 113 of the coupling transition 110 is the narrowest part of the coupling transition 110 and remains relatively narrow throughout.

The bell 120 includes a first bottom section 121 and a second bottom section 122. The first bottom section 121 is trapezoidal in shape and leads to the second bottom section 122 which is also trapezoidal in shape. The bell 120 also includes an upper portion 123 which is trapezoidal in shape. In addition, the bell 120 includes two sidewalls 124. The first bottom section 121 is partially overlapped by the upper portion of the coupling transition 110 due to the curved design of the variable-width slot 111 at the ending 115 of the coupling transition 110. Meanwhile, the second bottom section 122 is disposed around an outside of the coupling transition 110, similar to the two sidewalls 124 and the upper portion 123.

Figure 1D:
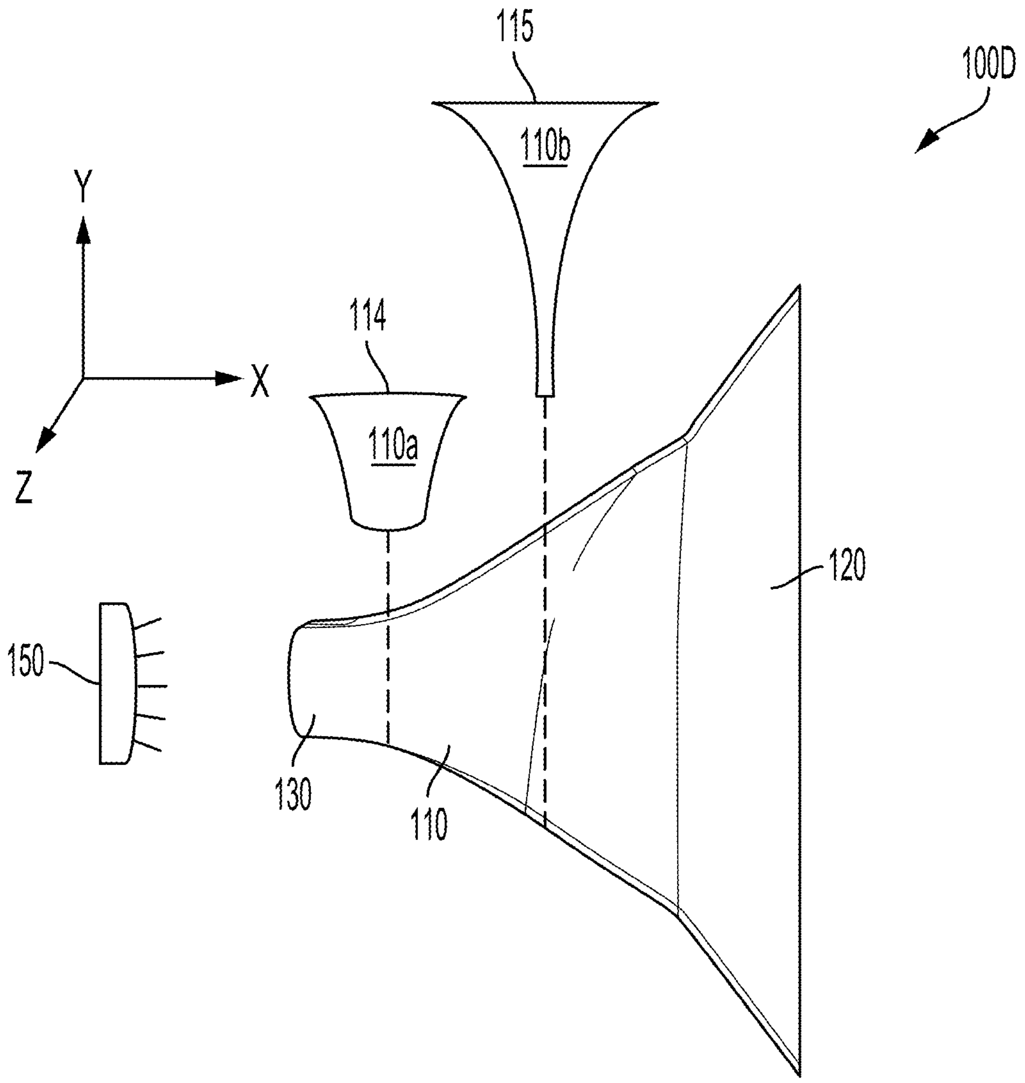
FIG. 1D is a diagram illustrating a side-perspective view of the loudspeaker of FIG. 1A according to example embodiments.

FIG. 1D illustrates a side-perspective view 100D of the loudspeaker of FIG. 1A according to example embodiments. Referring to FIG. 1D, a driver 150 may emit sound toward the throat 130 of the horn. In this case, the sound may enter through the throat and travel through the coupling transition 110 out through the bell 120. In this example, shown are the differences in area size of the variable-width slot between the beginning 114 of the coupling transition 110 and the ending 115 of the coupling transition 110.

In particular, a first area 110*a* of the coupling transition 110 corresponding to the beginning 114 of the coupling transition 110 is shown in two dimensions (Y-Z plane). Furthermore, a second area 110*b* of the coupling transition 110 is shown in the same two dimensions (Y-Z plane) at the ending 115 of the coupling transition 110. That is, while the side-perspective view 100D of the coupling transition 110 is in two dimension of the X-Y plane, the area views of the first area 110*a* and the second area 110*b* are shown in the two dimensions of the Y-Z plane.

As can be seen in FIG. 1D, the shape of the coupling transition 110 changes in both height and width. In particular, the height increases from the first area 110*a* to the second area 110*b*, while the width narrows at the bottom portion of the coupling transition 110 from the first area 110*a* to the second area 110*b*. This is done by the curved surfaces along the sidewalls 116 (shown in FIG. 1C) of the coupling transition 110 that curve in each of three-dimensions (Y-Z and X-Z planes) creating the different shapes of the coupling transition 110. The three-dimensional curvature simultaneously creates more restriction on the sound pressure level at the bottom portion of the coupling transition 110 and increase/enables more sound pressure level to exist from the upper portion of the coupling transition 110 creating more sound output from the upper portion of the variable-width slot 111.

As an example, a width in the Z direction of the first area 110*a* of the coupling transition 110 may be bigger than a width in the Z direction of the second area 110*b* of the coupling transition 110. As an example, the width of the first area 110*a* may be twice as wide, three times as wide, or even more, or any other desired width difference, with respect to the width of the second area 110*b*. Meanwhile, a height of the first area 110*a* of the coupling transition 110 is smaller/less than a height of the second area 110*b* of the coupling transition 110. For example, the height of the first area 110*a* may be half the height of the second area 110*b*, two-thirds of the height of the second area 110*b*, or any other desired height difference.

Figure 1E:
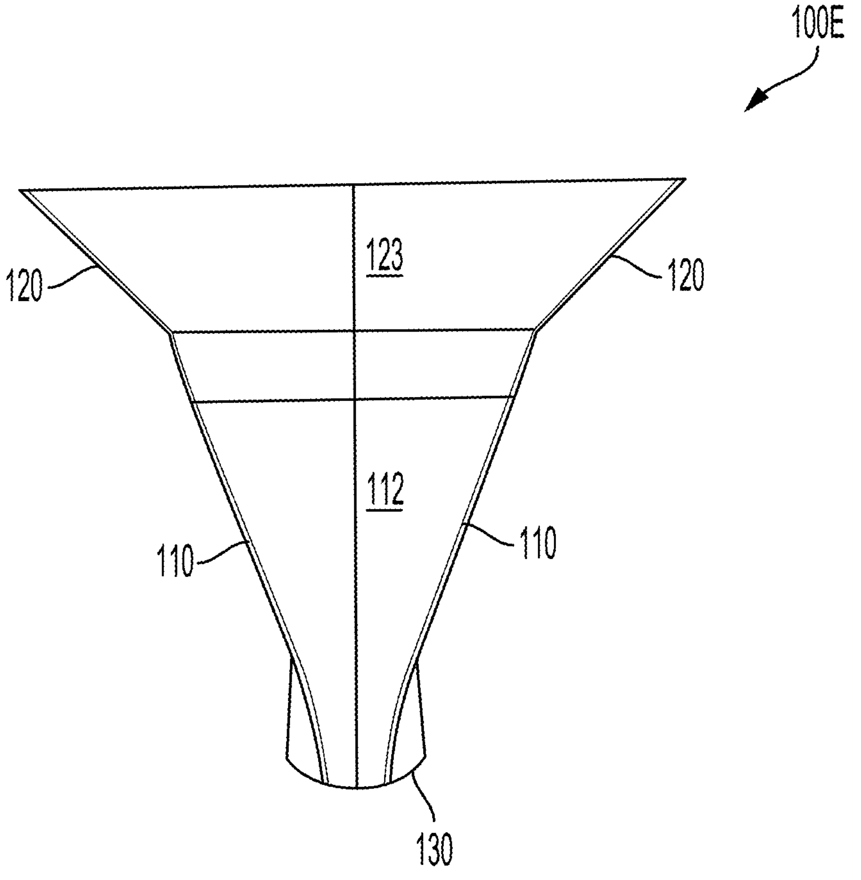
FIG. 1E is a diagram illustrating a top-perspective view of the loudspeaker of FIG. 1A according to example embodiments.

FIG. 1E illustrates a top-perspective view 100E of the loudspeaker of FIG. 1A according to example embodiments. Referring to FIG. 1E, the loudspeaker is being viewed from above. Here, the upper portion 123 of the bell 120 and the upper portion 112 of the coupling transition 110 are visible. Also, the throat 130 is shown at the bottom of the drawing. As can be seen from this view, the upper portion 123 of the bell 120 is trapezoidal in shape and includes a width that narrows as it gets closer to the upper portion 112 of the coupling transition 110. Likewise, the upper portion 112 of the coupling transition 110 is also a trapezoidal shape with a width that narrows as it gets closer to the throat 130 of the loudspeaker apparatus.

Figure 1F:
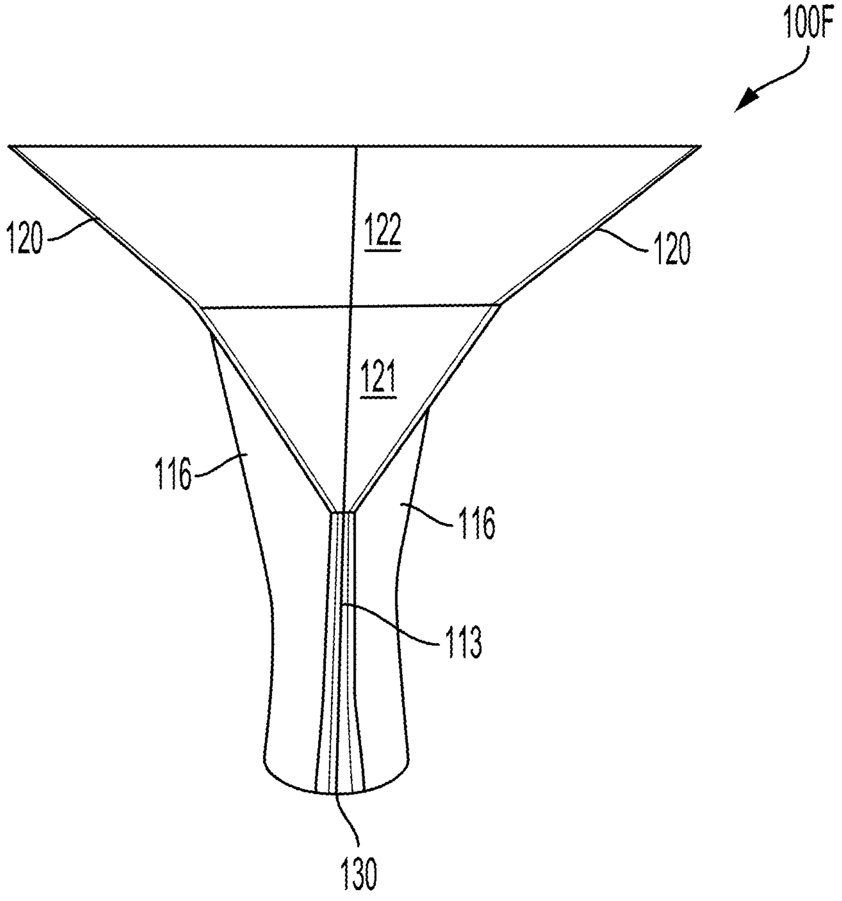
FIG. 1F is a diagram illustrating a bottom-perspective view of the loudspeaker of FIG. 1A according to example embodiments.

FIG. 1F illustrates a bottom-perspective view 100F of the loudspeaker of FIG. 1A according to example embodiments. Referring to FIG. 1F, the loudspeaker is being viewed from below. Here, the second bottom section 122 of the bell 120 includes a trapezoidal shape that narrows as it gets closer to the first bottom section 121. Meanwhile, the first bottom section 121 includes a trapezoidal shape, that almost seems triangular, that stops when it gets to the bottom portion 113 of the coupling transition 110. Furthermore, the bottom portion 113 of the coupling transition 110 includes a roughly linear shape and is where the sidewalls 116 of the coupling transition 110 pinch together and almost meet.

Figure 1G:
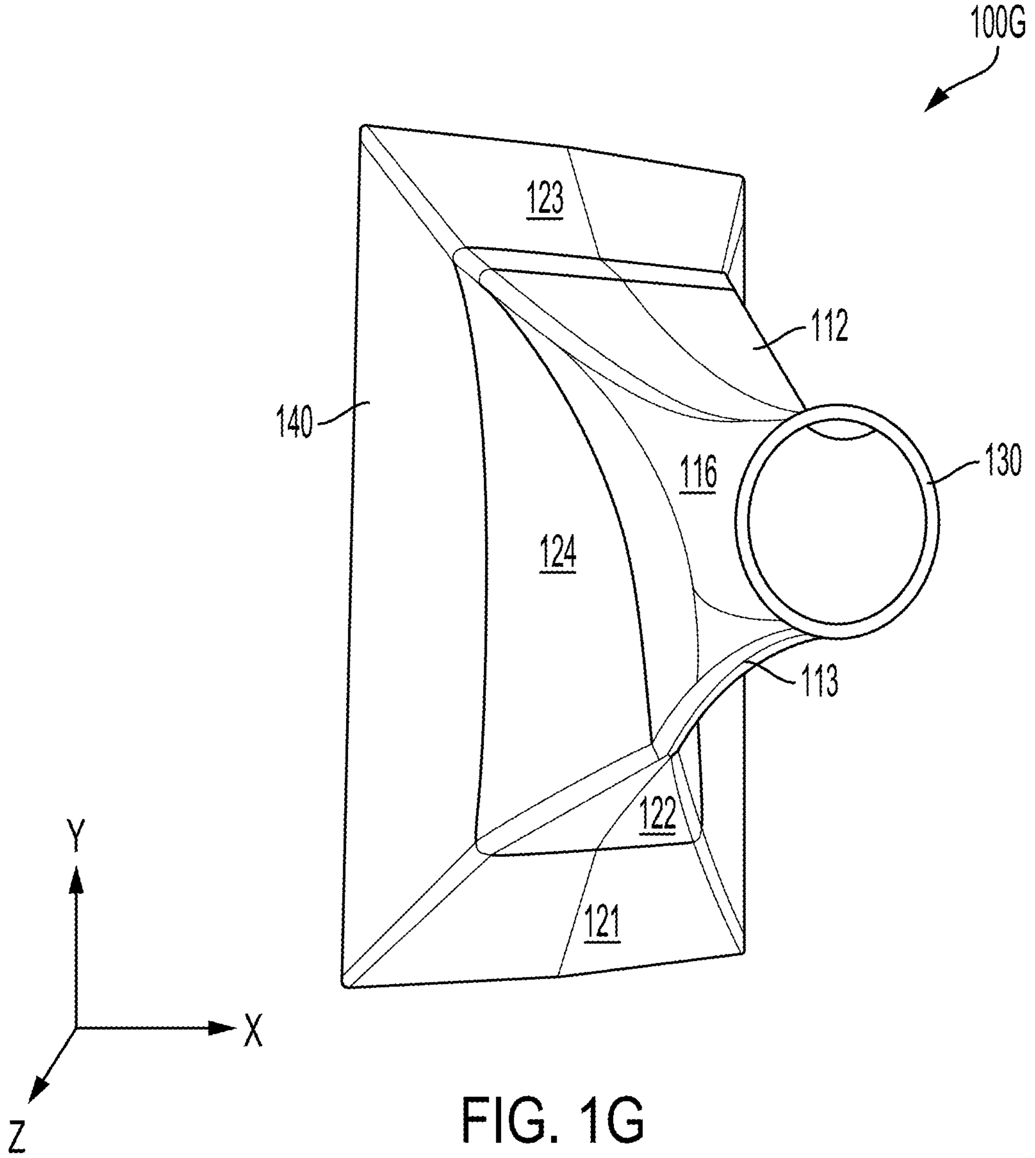
FIG. 1G is a diagram illustrating an angled-perspective view of the loudspeaker of FIG. 1A according to other example embodiments.

FIG. 1G illustrates an angled-perspective view 100G of the loudspeaker of FIG. 1A according to other example embodiments. Referring to FIG. 1G, there is shown a rear-view of the loudspeaker apparatus which enables understanding of the curved nature of the sidewalls 116 of the coupling transition 110 and the curved nature of the sidewalls 124 of the bell 120. In this example, both the sidewalls 116 and the sidewalls 124 curve/flare in each of three dimensions. Here, the bottom portion 113 of the coupling transition 110 pinches the sidewalls 116 together which forces sound pressure up towards the upper portion 112 of the coupling transition 110, as sound travels from the throat 130 through the coupling transition 110, and toward the bell 120. In addition, the first bottom section 121 and the second bottom section 122 of the bell 120 flare outward from the coupling transition 110 toward the mouth 140 opening in the bell 120 where the sound is output.

Figure 2:
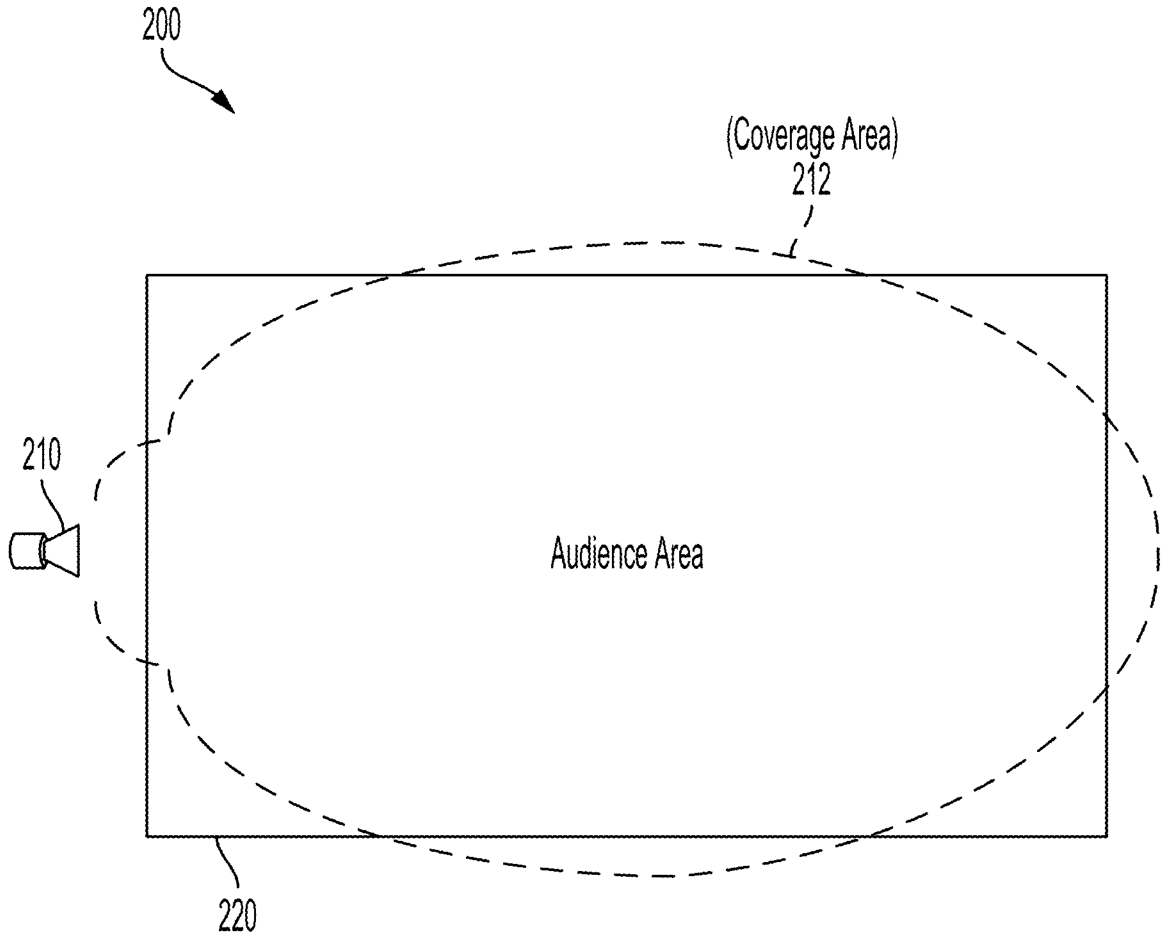
FIG. 2 is a diagram illustrating an example of a sound coverage area of the loudspeaker of FIG. 1A according to example embodiments.

FIG. 2 illustrates an example of a sound coverage area 212 of a loudspeaker 210 according to example embodiments. A traditional constant directivity horn creates a sound coverage area that is more fan-shaped or more trapezoidal-shaped. In the example embodiments, the constant coverage horn described herein can create a coverage area that is more rectangular-shaped. Referring to FIG. 2, the loudspeaker 210 may include a horn such as shown and described with respect to FIGS. 1A-1G, and may include a driver providing sound. The horn may create a coverage area that is suitable for a rectangular audience area 220 as shown. The sound coverage area 212 represents the SPL of the sound as it is output. In this example, the sound coverage area 212 reaches an end of the rectangular audience area thereby providing relatively constant coverage of SPL to the audience members that are both nearest to and farthest away from the loudspeaker 210.

Although the coverage area in FIG. 2 is more rectangular in shape, the horn may be designed to enable a different shaped coverage area.

In addition, while the examples of FIGS. 1A-1G, and 2, show the horn as having a mouth with a rectangular shape (i.e., with a height that is greater than its width), it should also be appreciated that the mouth may have a square shape. As another example, the mouth may have a rectangular shape in which the height is less than the width, etc.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. A horn comprising:

a throat comprising an opening that receives sound;

a bell that directs the sound;

a mouth opening that outputs the sound; and a variable-width slot disposed between the throat and the bell which directs the sound, wherein the variable-width slot comprises a lower portion with a first width and an upper portion with a second width which is greater than the first width, wherein the lower portion of the variable-width slot is associated with a lower vertical coverage region of the horn and the upper portion of the variable-width slot is associated with an upper vertical coverage region of the horn.

2. The horn of claim 1, wherein the variable-width slot comprises a curved shape from the lower portion to the upper portion.

3. The horn of claim 1, wherein the variable-width slot comprises a V shape.

4. The horn of claim 1, wherein the variable-width slot comprises a pie-piece shape.

5. The horn of claim 1, wherein the variable-width slot comprises a lower acoustic resistance in the upper portion in comparison to the lower portion.

6. The horn of claim 1, wherein the mouth comprises a rectangular opening comprising an upper portion that has a first width, a bottom portion that has a second width, and sides between the upper portion and the bottom portion which include a vertical height, wherein the vertical height is greater than the first width and the second width.

7. The horn of claim 1, wherein the mouth comprises a rectangular opening comprising an upper portion that has a first width, a bottom portion that has a second width, and sides between the upper portion and the bottom portion which include a vertical height, wherein the vertical height is less than the first width and the second width.

8. The horn of claim 1, wherein the mouth comprises a square opening comprising an upper portion that has a first width, a bottom portion that has a second width, and sides between the upper portion and the bottom portion which include a vertical height, wherein the vertical height is equal to the first width and the second width.

9. The horn of claim 1, wherein a horizontal coverage area of the horn is dependent on the relative location of said horizontal coverage within the range of the vertical coverage area of the horn.

10. A loudspeaker comprising:

a throat comprising an opening that receives sound;

a bell that directs the sound;

a mouth opening that outputs the sound;

a sound source positioned behind the opening of the throat which is configured to output the sound towards the opening of the throat; and a variable-width slot disposed between the throat and the bell which directs the sound, wherein the variable-width slot comprising a lower portion with a first width and an upper portion with a second width which is greater than the first width, wherein the lower portion of the variable-width slot is associated with a lower vertical coverage region of the horn and the upper portion of the variable-width slot is associated with an upper vertical coverage region of the horn.

11. The loudspeaker of claim 10, wherein the variable-width slot comprises a curved shape from the lower portion to the upper portion.

12. The loudspeaker of claim 10, wherein the variable-width slot comprises a V shape.

13. The loudspeaker of claim 10, wherein the variable-width slot comprises a pie-piece shape.

14. The loudspeaker of claim 10, wherein the variable-width slot comprises a lower acoustic resistance in the upper portion in comparison to the lower portion.

15. The loudspeaker of claim 10, wherein the mouth comprises a rectangular opening comprising an upper portion that has a first width, a bottom portion that has a second width, and sides between the upper portion and the bottom portion which include a vertical height, wherein the vertical height is greater than the first width and the second width.

16. The loudspeaker of claim 10, wherein the mouth comprises a rectangular opening comprising an upper portion that has a first width, a bottom portion that has a second width, and sides between the upper portion and the bottom portion which include a vertical height, wherein the vertical height is less than the first width and the second width.

17. The loudspeaker of claim 10, wherein the mouth comprises a square opening comprising an upper portion that has a first width, a bottom portion that has a second width, and sides between the upper portion and the bottom portion which include a vertical height, wherein the vertical height is equal to the first width and the second width.

18. The loudspeaker of claim 10, wherein a horizontal coverage area of the loudspeaker is dependent on the relative location of said horizontal coverage within the range of the vertical coverage area of the horn.

19. The horn of claim 1, wherein the variable-width slot is configured such that the upper portion presents lower acoustic resistance to sound propagation than the lower portion, thereby directing a greater portion of sound energy toward an upper vertical coverage region with respect to a lower vertical coverage region of the horn.

* * * * *